United States Patent
Maruyama et al.

[19]

[11] Patent Number: 6,038,089
[45] Date of Patent: Mar. 14, 2000

[54] BEAM SHAPING OPTICAL SYSTEM

[75] Inventors: Koichi Maruyama; Junji Kamikubo, both of Tokyo, Japan

[73] Assignee: Asahi Kogaku Kogyo Kabushiki Kaisha, Tokyo, Japan

[21] Appl. No.: 08/856,180

[22] Filed: May 14, 1996

[30] Foreign Application Priority Data

May 14, 1996 [JP] Japan .................................. 8-143649

[51] Int. Cl.[7] ............................. G02B 5/04; G02B 13/10; G02B 9/62; G11B 7/00
[52] U.S. Cl. ..................... 359/837; 359/831; 359/758; 359/669; 369/112; 369/122
[58] Field of Search ..................... 359/831, 837, 359/669, 670, 671, 758; 369/112, 122; 372/100

[56] References Cited

U.S. PATENT DOCUMENTS

| | | | |
|---|---|---|---|
| 4,127,828 | 11/1978 | Klauminzer | 359/837 |
| 4,333,173 | 6/1982 | Yonezawa et al. | 359/837 |
| 4,750,819 | 6/1988 | Sugiki | 359/837 |
| 4,770,507 | 9/1988 | Arimoto et al. | 359/837 |
| 4,850,686 | 7/1989 | Morimoto et al. | 359/837 |
| 4,948,233 | 8/1990 | Maruyama . | |
| 5,155,633 | 10/1992 | Grove et al. | 359/837 |
| 5,274,489 | 12/1993 | Smith et al. | 359/837 |
| 5,280,464 | 1/1994 | Itoh et al. . | |
| 5,309,423 | 5/1994 | Noguchi et al. . | |
| 5,321,550 | 6/1994 | Maruyama et al. . | |
| 5,596,456 | 1/1997 | Luecke | 359/837 |
| 5,701,210 | 12/1997 | Ohtaki | 359/669 |

*Primary Examiner*—Ricky D. Shafer
*Attorney, Agent, or Firm*—Greenblum & Bernstein, P.L.C.

[57] ABSTRACT

A beam shaping optical system which is provided with a first wedge prism having two refractive surfaces defining a first principal section, and a second wedge prism having two refractive surfaces defining a second principal section that is parallel to the first principal section, wherein a reference ray of light forms incident angles at each of the refractive surfaces of the prisms satisfying the following condition (1):

$$\left| \sum_{j=1}^{L} \alpha_j \right| < 0.020$$

7 Claims, 6 Drawing Sheets

FIG. 4
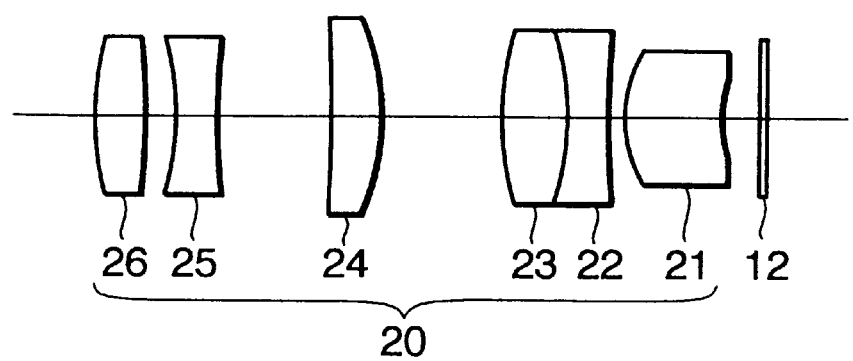
FIG. 5A
FIG. 5B
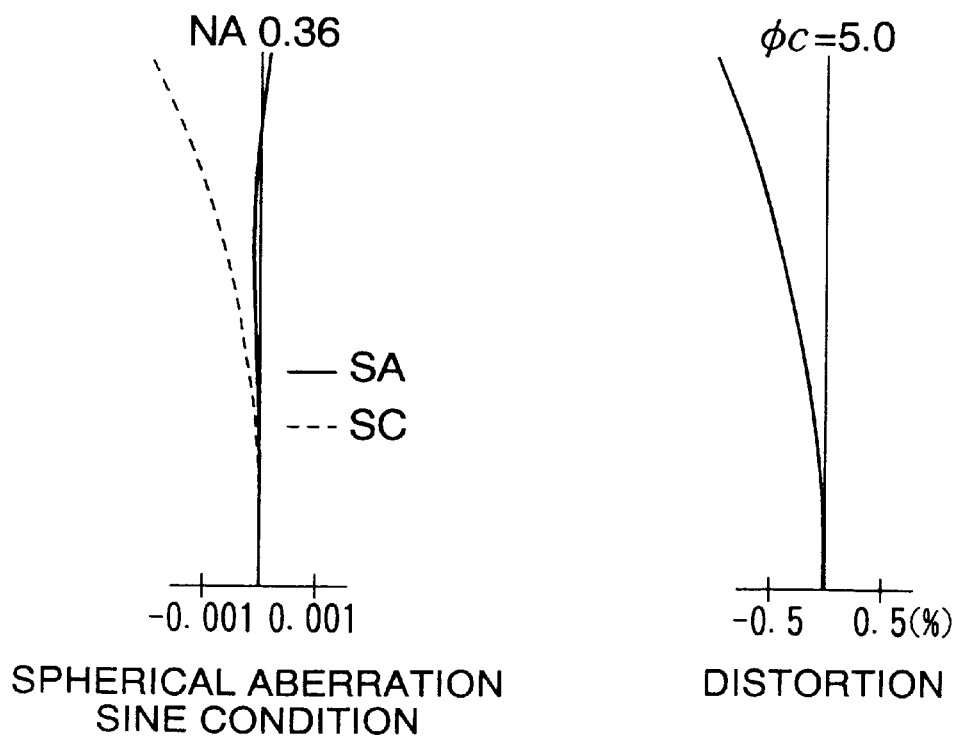

BEAM SHAPING OPTICAL SYSTEM

BACKGROUND OF THE INVENTION

The present invention relates to a beam shaping optical system that affects a cross-sectional shape of a light beam. In particular, the present invention relates to a beam shaping optical system used in a light emitting device or an imaging optical system.

U.S. Pat. No. 4,948,223 (hereinafter "Patent") discloses a light shaping optical system as shown in FIG. 7. The optical system includes first and second wedge prisms 1 and 2 that are arranged in order from an incident side (i.e., a side from which a light ray enters the optical system, the left side in FIG. 7). The beam shaping optical system operates to, for example, convert an elliptical-shaped light beam (for example, as emitted from a semiconductor laser) into a circular-shaped light beam. The prisms 1 and 2 have principal sections that are parallel to each other, where a principal section of a wedge prism is defined as a plane perpendicular to both of the two refractive surfaces of the wedge prism through which a light beam passes. In other words, the principal section is defined as a plane perpendicular to a ridgeline of the refractive surfaces.

This type of beam shaping optical system is generally included in an optical system of an optical disk device, a magneto-optic disk device, a laser beam printer, or the like in order to shape a cross-sectional shape of a light beam emitted by a light source such as a semiconductor laser so that the light beam can be used effectively, or in order to form a symmetrical beam spot on an object surface.

Further, in order to increase the speed of such devices (laser beam printers and the like) a plurality of light beams may be simultaneously used to read or write information. In this case, a multi-beam semiconductor laser (not shown) can be used as a light source. A multi-beam semiconductor laser includes more than three light emitting points arranged in a single element and principal rays from the light emitting points forms predetermined angles with one another.

However, since the conventional beam shaping optical system disclosed in the patent is designed for converting the cross-sectional shape of a single light beam, there is a problem in that, if there is a minor variation in an incident angle, due to difference in exit angles of light beams emitted from light emitting points of a multi-beam semiconductor laser, there is a relatively large change in angular magnification by the beam shaping optical system. The following TABLE 1 is based on data disclosed in the patent and shows a relationship between the incident angle $\phi$ (deg.) to the first prism 1 and the exit angle $\omega$ (deg.) from the second prism 2 to illustrate the occurrence of an exit angle error $\delta$ for variations in the incident angle $\phi$. The TABLE 1 also shows an imaginary exit angle $\psi$, an angular magnification $\gamma$, a percentage difference $\gamma'$, and the exit angle error $\delta$. The imaginary exit angle $\psi$ is defined as an exit angle when the angular magnification is constant, i.e., the imaginary exit angle $\psi$ is determined by multiplying the incident angle $\phi$ by a paraxial angular magnification $\gamma_0$ (equal to 0.669041 in this case). The angular magnification $\gamma$ is the actual angular magnification and the percentage difference $\gamma'$ is a percentage difference between the actual angular magnification $\gamma$ at each incident angle with respect to the paraxial angular magnification $\gamma_0$, that is, $\gamma'=(\gamma_0-\gamma)/\gamma_0$. The exit angle error $\delta$ is obtained by subtracting the imaginary exit angle $\psi$ from the exit angle $\omega$.

TABLE 1

| Incident Angle $\phi$ | Exit Angle $\omega$ | Imaginary Exit Angle $\psi$ | Angular Magnification $\gamma$ | % Difference $\gamma'$ | Exit Angle Error $\delta$ |
|---|---|---|---|---|---|
| −2.0 | −1.33272 | −1.33808 | 0.66636 | 0.40% | 0.00536 |
| −1.6 | −1.06710 | −1.07047 | 0.66694 | 0.31% | 0.00337 |
| −1.2 | −0.80098 | −0.80285 | 0.66748 | 0.23% | 0.00187 |
| −0.8 | −0.53440 | −0.53523 | 0.66800 | 0.16% | 0.00083 |
| −0.4 | −0.26739 | −0.26762 | 0.66848 | 0.08% | 0.00023 |
| 0.0 | 0.00000 | 0.00000 | 0.66904 | 0.00% | 0.00000 |
| 0.4 | 0.26774 | 0.26762 | 0.66935 | −0.05% | 0.00012 |
| 0.8 | 0.53584 | 0.53523 | 0.66980 | −0.11% | 0.00061 |
| 1.2 | 0.80422 | 0.80285 | 0.67018 | −0.17% | 0.00137 |
| 1.6 | 1.07286 | 1.07047 | 0.67054 | −0.22% | 0.00239 |
| 2.0 | 1.34173 | 1.33808 | 0.67087 | −0.27% | 0.00365 |

Thus, the amount of change of the angular magnification with respect to a change in the incident angle is relatively large in the conventional beam shaping optical system. Therefore, when the conventional beam shaping optical system is used for a multi-beam optical system with a multi-beam semiconductor laser, bean spots formed on an object surface are positioned at irregular intervals even if the emitting points of the light beams are positioned at regular intervals.

Further, the exit angle error in the conventional beam shaping optical system cannot be counterbalanced by altering a rotationally symmetric lens such as a collimator lens or an objective lens of the optical system. Because the exit angle error contains distortion that are represented by even order functions of the incident angle (as shown in FIG. 3), whereas distortion of a rotationally symmetric lens such as a collimator lens or an objective lens is represented by third or higher order, odd order functions.

SUMMARY OF THE INVENTION

It is therefore an object of the present invention to provide a beam shaping optical system in which an amount of change in angular magnification due to a change in incident angle is reduced. A further object of the present invention is to provide a light emitting device using the beam shaping optical system in an imaging optical system to converge light beams emitted from light emitting points aligned at regular intervals to form beam spots at regular intervals.

According to an aspect of a beam shaping optical system according to the present invention, which is provided with a first wedge prism having two refractive surfaces defining a first principal section, and a second wedge prism having two refractive surfaces defining a second principal section that is parallel to the first principal section, wherein a reference ray of light forms incident angles at each of the refractive surfaces of the prisms satisfying the following condition (1):

$$\left| \sum_{j=1}^{L} \alpha_j \right| < 0.020 \quad (1)$$

where j is a refractive surface number defined from the incident side,

L is a total number of refractive surfaces, and $$\alpha_j = \prod_{k=1}^{j-1} \gamma_k \cdot \varepsilon_j$$

where

π is an operator to give multiplication of all of the elements, $$\gamma_j = \frac{\cos\theta_{0j}}{(n_{1j}^2/n_{0j}^2 - \sin^2\theta_{0j})^{1/2}}$$

$$\varepsilon_j = -\frac{(n_{1j}^2/n_{0j}^2 - 1)\sin\theta_{0j}}{(n_{1j}^2/n_{0j}^2 - \sin^2\theta_{0j})\cos\theta_{0j}}$$

where $\theta_{0j}$ is an incident angle of said reference light ray to the j-th surface, $n_{0j}$ is a refractive index of a medium at the incident side of the j-th surface, and $n_{1j}$ is a refractive index of a medium at the exit side of the j-th surface.

The beam shaping optical system of the present invention may be arranged in a light emitting device that is provided with a light source including a plurality of light emitting points and a collimator lens for converting light beams from the light source into parallel beams. In such a light emitting device, the beam shaping optical system is positioned such that the exit light beams from the collimator lens are made incident thereon.

In another aspect of the invention, a light emitting device comprises a light source having a plurality of light emitting points, a collimator lens for converting the light beams from the light source into parallel beams, and a beam shaping optical system for converting a sectional shape of each of the light beams from the collimator lens. The beam shaping optical system comprising two wedge prisms, and the collimator lens has distortion to compensate distortion generated by the beam shaping optical system.

In a still further aspect of the invention, an imaging optical system comprises a light source having a plurality of light emitting points, a collimator lens for converting the light beams from the light source into parallel beams, a beam shaping optical system for converting a sectional shape of each of the light beams from the collimator lens and an objective lens for converging the light beams from the beam shaping optical system onto a medium. The beam shaping optical system comprising two wedge prisms, and the objective lens has distortion to compensate distortion generated by the beam shaping optical system.

BRIEF DESCRIPTION OF THE DRAWINGS

FIG. 4 is a lens diagram of a collimator lens of the magneto-optic disk device shown in FIG. 1;

FIGS. 5(A) and 5(B) are graphs showing aberrations of the collimator lens alone;

DETAILED DESCRIPTION OF THE PREFERRED EMBODIMENTS

Figure 1:
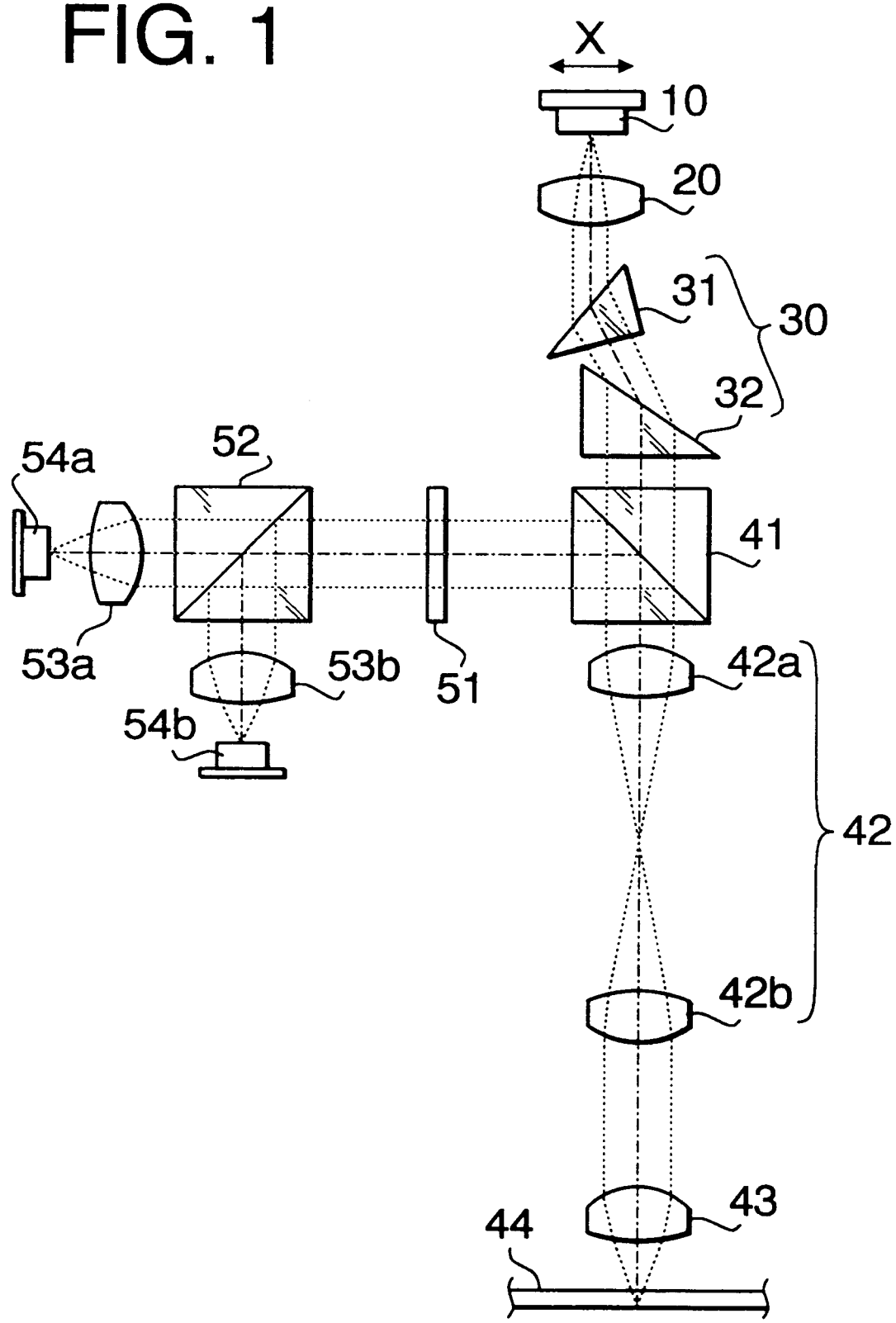
FIG. 1 shows an optical system of a magneto-optic disk device including a beam shaping optical system of the embodiment.

Initially, a beam shaping optical system according to an embodiment of the present invention is described and thereafter a specific numerical example, in which a beam shaping optical system is applied to an imaging optical system of a magneto-optic disk device, is described.

The beam shaping optical system according to an embodiment of the present invention comprises at least two wedge prisms, each of which has an incident surface and an exit surface through which a light beam passes. The two wedge prisms have principal sections that are parallel to each other and are designed such that a reference ray of light forms incident angles θ0j at each of the incident and exit surfaces of each of the wedge prisms satisfying the following condition (1):

$$\left|\sum_{j=1}^{L} \alpha_j\right| < 0.020 \quad (1)$$

where j is a refractive surface number defined from the incident side;

L is the total number of refractive surfaces and surface numbers are defined from the incident side, and $$\alpha_j = \prod_{k=1}^{j-1} \gamma_k \cdot \varepsilon_j$$

where

π is an operator indicating multiplication of all of the elements, and $$\gamma_j = \frac{\cos\theta_{0j}}{(n_{1j}^2/n_{0j}^2 - \sin^2\theta_{0j})^{1/2}}$$

$$\varepsilon_j = -\frac{(n_{1j}^2/n_{0j}^2 - 1)\sin\theta_{0j}}{(n_{1j}^2/n_{0j}^2 - \sin^2\theta_{0j})\cos\theta_{0j}}$$

where $\theta_{0j}$ is the incident angle of the reference light ray to the j-th surface, $n_{0j}$ is the refractive index of medium at the incident side of the j-th surface, and $n_{1j}$ is the refractive index of medium at the exit side of the j-th surface.

The reference light ray is defined as a ray that enters into the first prism at a predetermined incident angle so that a designed angular magnification can be obtained.

The angular magnification is represented by function (a polynomial expression) of the incident angle. With the above construction, a first order component of the change of the angular magnification can be reduced. Thus, when the exit light beams are converged on an object surface, position error in beam spots produced can be reduced.

For instance, when an incident light ray forms and angle of 1 degree (0.017453 rad.) with respect to the reference light ray and $\Sigma\alpha_j=0.02$ (see condition (1) above), a difference of the exit angle from that for the reference light ray is equal to 0.00035 rad. (=0.017453 rad.×0.02). The position error of the beam spot on the object surface is defined as an integral of the difference of the angular magnification (i.e., coefficient is ½). For example, consider three beam spots to be formed at 1 mm intervals using a reference light ray having an incident angle of 0 degrees and light rays having incident angles of ±1 degree, respectively. If the angular magnification is constant regardless of the incident angle, it is possible to form the beam spots at the desired interval. However, in reality, the angular magnification changes as a function of the incident angle such that the beam spot at one side is formed at a distance of 1+0.000174 mm (0.00035/2×1 mm=0.000174 mm) from the reference beam spot, while the other side beam spot is formed at a distance of −1+0.000174 mm from the reference beam spot.

The determination of the above condition (1) is now described. Generally, the beam shaping optical system includes a plurality of wedge prisms having refracting surfaces labeled from a first surface to L-th surface starting from the most incident side. The angular magnification of the optical system for a light ray P is considered. The incident angle of the light ray P to the first refractive surface is different from that of the reference light ray by an angle $\Delta_1$. That is, the light ray P forms the angle $\Delta_1$ with the reference light ray at the incident side of the first refractive surface.

In the following description, $\epsilon_j$ denotes a ratio of the amount of change in the angular magnification for a change in the incident angle of 1 degree at the j-th surface, $\Delta_j$ denotes a difference of incident angles between the reference light ray and the light ray P at the j-th surface, $\gamma_j$ denotes an angular magnification for the reference light ray at the j-th surface, and $\Gamma(\Delta_1)$ denotes an angular magnification of the total system of the beam shaping optical system for the light ray P. The angular magnification of the total system for the reference light ray is represented by $\Gamma(0)$. The angular difference between the light ray P and the reference light ray varies depending on the angular magnification of each of the retracting surfaces of the prisms, thus, the difference $\Delta_j$ at the j-th surface is expressed by the following equation (2):

$$\Delta_j = \prod_{k=1}^{j-1} \gamma_k \cdot \Delta_1. \tag{2}$$

The angular magnification $\Gamma(\Delta_1)$ of the total system of the beam shaping optical system for the light ray P is shown as equation (3):

$$\Gamma(\Delta_1) = \gamma_1(1+\epsilon_1\Delta_1) \times \ldots \times \gamma_L(1+\epsilon_L\Delta_L) \tag{3}$$

$$= \prod_{j=1}^{L} (\gamma_j \cdot (1+\epsilon_j\Delta_j))$$

Here, if the absolute value of the difference $\Delta_j$ is much smaller than 1 ($|\Delta_j|<<1$), the above equation (3) can be rewritten as the following equation (4):

$$\Gamma(\Delta_1) = \prod_{j=1}^{L} \gamma_j \cdot \left(1 + \sum_{j=1}^{L}(\epsilon_j\Delta_j)\right) \tag{4}$$

-continued $$= \Gamma(0)\left(1 + \sum_{j=1}^{L}(\epsilon_j\Delta_j)\right)$$

$$= \Gamma(0)\left(1 + \left(\sum_{j=1}^{L}\left(\prod_{k=1}^{j-1}\gamma_k\right)\epsilon_j\right)\Delta_1\right)$$

Defining a rate of change $\alpha_j$ of the angular magnification at the j-th surface with respect to the change $\Delta_j$ in incident angle as in equation (5), the equation (4) can be converted to the equation (6).

$$\alpha_j = \prod_{k=1}^{j-1} \gamma_k \cdot \epsilon_j \tag{5}$$

$$\Gamma(\Delta_1) = \Gamma(0)\left(1 + \left(\sum_{j=1}^{L}\alpha_j\right)\Delta_1\right) \tag{6}$$

The equation (6) shows that, in order to minimize the change of the angular magnification $\Gamma(\Delta_1)$ of the total system, $\Sigma\alpha_j$ should be set as close to zero as possible.

The rate of change of the angular magnification $\alpha_j$ may be described using the refractive index of each medium and the incident angle of the reference light ray at each surface j, as described in the following. At the j-th surface, the relationship among the refractive index $n_{0j}$ of the medium at the incident side, the refractive index $n_{1j}$ of the medium at the exit side, the incident angle $\theta_{0j}$, and the refractive angle $\theta_{1j}$ is expressed by equation (7) according to Snell's law of refraction. Further, the angular magnification $\gamma_j$ of the j-th surface is expressed by the equation (8).

$$n_{0j}\sin\theta_{0j} = n_{1j}\sin\theta_{1j} \tag{7}$$

$$\gamma_j = \frac{d\theta_{1j}}{d\theta_{0j}} = \frac{1}{(1-n_{0j}^2/n_{1j}^2 \times \sin^2\theta_{0j})^{1/2}} \cdot \frac{n_{0j}}{n_{1j}} \cdot \cos\theta_{0j} \tag{8}$$

$$= \frac{\cos\theta_{0j}}{(n_{1j}^2/n_{0j}^2 - \sin^2\theta_{0j})^{1/2}}$$

The rate of change $\gamma_j'$ of the angular magnification at the j-th surface can be found by differentiating the angular magnification $\gamma_j$ as shown in equation (9).

$$\gamma_j' = \frac{d^2\theta_{1j}}{d\theta_{0j}^2} = -\frac{\gamma_j^3(n_{1j}^2/n_{0j}^2-1)(-\sin\theta_{0j})(-2)}{2\cos^3\theta_{0j}} \tag{9}$$

$$= -\frac{(n_{1j}^2/n_{0j}^2-1)\sin\theta_{0j}}{(n_{1j}^2/n_{0j}^2-\sin^2\theta_{0j})^{3/2}}$$

Furthermore, the ratio $\epsilon_j$ of the rate of change of the angular magnification is calculated using equation (10), where the denominator is $\gamma_j$ of the equation (8) and the numerator is $\gamma_j'$ of the equation (9).

$$\epsilon_j = \gamma_j'/\gamma_j = \frac{d^2\theta_{1j}}{d\theta_{0j}^2} \bigg/ \frac{d\theta_{1j}}{d\theta_{0j}} \tag{10}$$

$$= -\frac{(n_{1j}^2/n_{0j}^2-1)\sin\theta_{0j}(n_{1j}^2/n_{0j}^2-\sin^2\theta_{0j})^{1/2}}{((n_{1j}^2/n_{0j}^2-\sin^2\theta_{0j})^{3/2})\cos\theta_{0j}}$$

$$= -\frac{(n_{1j}^2/n_{0j}^2 - 1)\sin\theta_{0j}}{(n_{1j}^2/n_{0j}^2 - \sin^2\theta_{0j})\cos\theta_{0j}}$$

As described above, the beam shaping optical system is characterized in that the incident angles $\theta_{0j}$ to each refractive surface are defined so that the absolute value of $\Sigma\alpha_j$ is lower than 0.020.

If the above condition is met, in the beam shaping optical system, the exit angle error due to a change of the incident angle can be lowered as compared to the conventional system. And further, when the exit angle error is represented by a polynomial expression in which the incident angle is a variable, a third order component becomes a primary factor for determining the amount of the exit angle error. In this case, since a rotational symmetric lens may have a distortion that is proportional to the cube of the incident angle, the exit angle error can be counterbalanced with a distortion of a rotational symmetric lens in the optical system.

In particular, when the beam shaping optical system described above is used in a light emitting device that further includes a light source and a collimator lens, the collimator lens may be designed to compensate for the exit angle error of the beam shaping optical system. In this case, the collimator lens is designed to have a negative distortion when aberrations of the collimator lens are evaluated under a condition in which a parallel light beam is incident into the collimator lens from the direction of the beam shaping optical system.

Alternatively, when the beam shaping optical system described above is used in an imaging optical system, the light beams emitted from the light emitting device, as described above, are converged by an objective lens. The objective lens may be designed to compensate for the exit angle error of the beam shaping optical system. In this case, the objective lens should be designed to have a positive distortion when aberrations of the objective lens are evaluated under a condition in which a parallel light beam is incident into the objective lens from the direction of the beam shaping optical system.

In either of the above cases, i.e., when the beam shaping optical system is used in the light emitting device or in the imaging optical system, the plurality of light emitting points of the light source may be aligned along a line that is parallel to the principal section of the prism, or alternatively, may be arranged having a two dimensional distribution in which the light emitting points are aligned along not only a parallel direction to the principal section but also along a perpendicular direction to the principal section.

An embodiment according to the present invention will now be described including detailed numerical examples. FIG. 1 shows an imaging optical system of a magneto-optic disk device that includes a beam shaping optical system 30.

As shown in FIG. 1, the imaging optical system includes a multi-beam semiconductor laser 10 that includes a central light emitting point and two peripheral light emitting points in a single substrate, a collimator lens 20 for converting light beams from the multi-beam semiconductor laser 10 into parallel light beams, and a beam shaping optical system 30 that contains a first wedge prism 31 and a second wedge prism 32 for adjusting a cross-sectional shape of each of the light beams.

A semiconductor laser includes a transition boundary plane between P-type material and N-type material. The light emitted from a semiconductor laser is a divergent light beam that has a larger divergent angle in a direction perpendicular to the transition boundary plane and a smaller divergent angle in a direction parallel to the transition boundary plane. Thus, the laser beam exiting from the collimator lens is a parallel beam having an elliptical cross-section with a major axis perpendicular to the transition boundary plane.

The light emitting points included in the multi-beam semiconductor laser 10 are aligned along a parallel direction to the transition boundary plane, and principal rays of the laser beams from the peripheral light emitting points form a predetermined angle with respect to the principal ray from the center light emitting point. As a result, three elliptical laser beams having coincident major axes are arranged along the minor axes. In the embodiment, the transition boundary plane of the multi-beam semiconductor laser 10 is defined as an X direction as shown in FIG. 1.

The beam shaping optical system 30, described in more detail below, is arranged such that the principal sections of the prisms are parallel to the X direction in order to magnify the laser beams in the X direction to form laser beams having a substantially circular cross-section.

The laser beams exit from the beam shaping optical system 30, pass through a half mirror prism 41, further pass through a relay lens system 42 including lenses 42a and 42b, and are then incident to an objective lens 43. The laser beams are converged by the objective lens 43 to form three separate beam spots on an object surface, such as a magneto-optic disk 44. In particular, the beam spots are arranged at regular intervals along the X direction.

The laser beams are reflected from the magneto-optic disk 44 such that reflected laser beams propagate back to the half mirror prism 41 through the objective lens 43 and the relay lens system 42. The returning laser beams are reflected from the half mirror prism 41 to a half-wave plate 51. The half-wave plate 51 rotates a plane of polarization of the laser beams by 45 degrees. Each of the transmitted laser beams are then divided by a polarization beam splitter 52 into two linear polarized components having polarization planes which are perpendicular to each other. The divided laser beams from the polarization beam splitter 52 are separately converged by condenser lenses 53a and 53b onto photodetectors 54a and 54b, respectively. At least one of the photodetectors 54a and 54b is a multiple zone detector that produces a tracking error signal and a focusing error signal. A recorded signal or data is detected by subtracting the signals from the photodetectors 54a and 54b.

Figure 2:
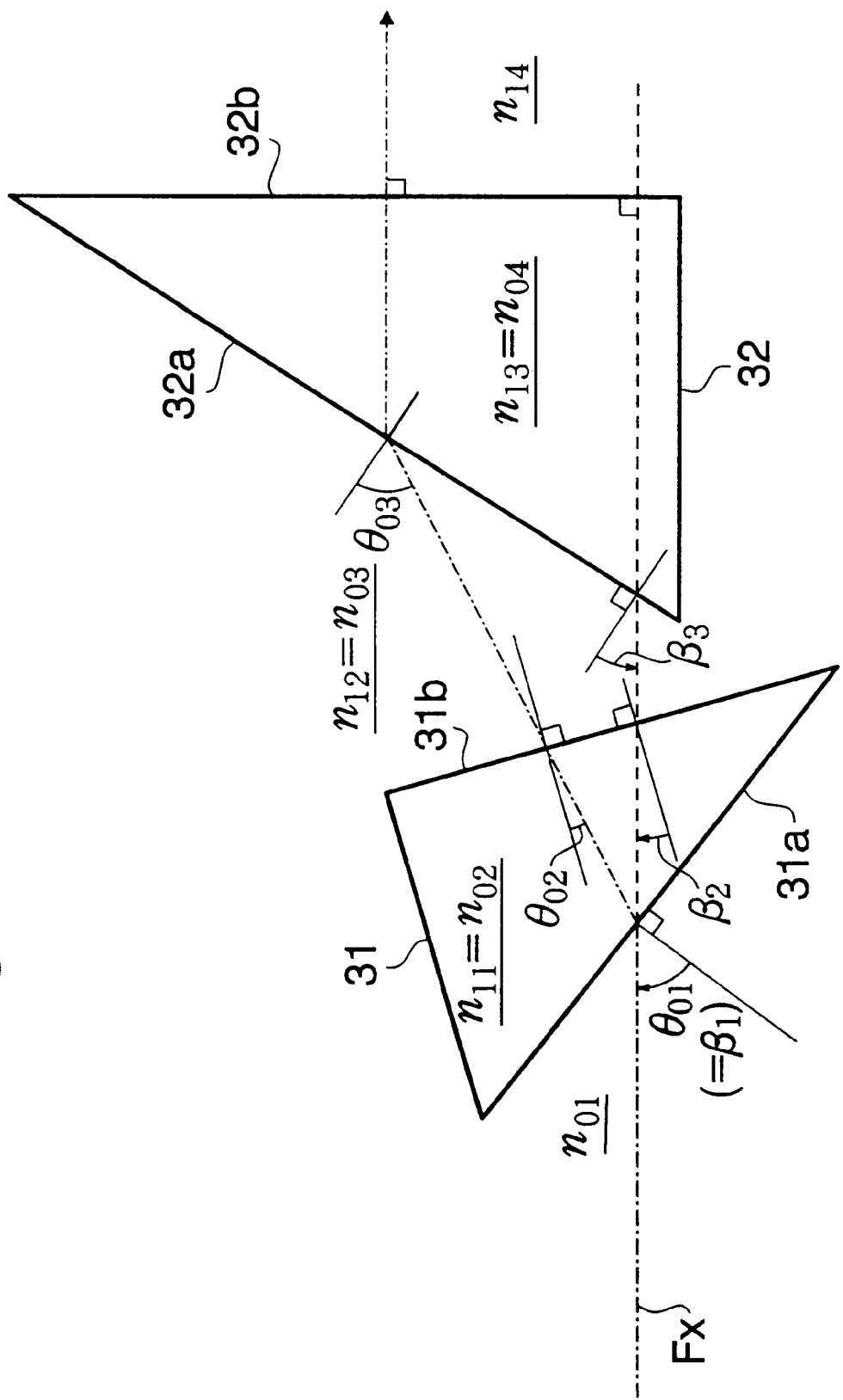
FIG. 2 is an enlarged drawing of a beam shaping optical system shown in FIG. 1.

FIG. 2 is an enlarged diagram of the beam shaping optical system 30 of the embodiment. In this description, a reference axis Fx, which is parallel to the optical axis of the collimator lens 20, is defined. The laser beams propagate from the left side in the view of FIG. 2. The j-th surface described above is a j-th refractive surface of the beam shaping optical system 30 as counted from the incident side. In this example, there are two prisms and thus four refractive surfaces, a first prism 31 includes a surface 31a which is a first surface (j=1) and a surface 31b which is a second surface (j=2), and a second prism 32 includes a surface 32a which is a third surface (j=3) and a surface 32b which is a fourth surface (j=4). A refractive index at the incident side of the j-th surface is represented by $n_{0j}$, a refractive index at the exit side of the j-th surface is represented by $n_{1j}$. In the case shown in FIG. 2, $n_{11}=n_{02}$, i.e., the index of the first prism 31, and $n_{13}=n_{04}$, i.e., the index of the second prism 32. An incident angle $\theta_{0j}$ of the reference light ray is defined for each refractive surface. An inclination angle $\beta_j$ of the j-th refractive surface is defined an acute angle measured from the normal of the j-th refractive surface to the reference axis Fx (a clockwise direction is defined as positive). As an example, particular values of the above, as well as the angular magnification $\gamma_j$, the ratio $\epsilon_j$ of the rate of change of the angular magnification, and the product $\alpha_j$ for each surface shown in TABLE 2.

TABLE 2

| j | $\beta_j$ | $n_{0j}$ | $n_{1j}$ | $\theta_{0j}$ | $\gamma_j$ | $\epsilon_j$ | $\alpha_j$ |
|---|---|---|---|---|---|---|---|
| 1 | 52.389 | 1.0000 | 1.6355 | 52.3890 | 0.4265 | −1.0619 | −1.0619 |
| 2 | 15.725 | 1.6355 | 1.0000 | −7.6938 | 1.6611 | −0.2377 | −0.1014 |
| 3 | −33.556 | 1.0000 | 1.5963 | −61.9291 | 0.3537 | 1.6405 | 1.1623 |
| 4 | 0.000 | 1.5963 | 1.0000 | 0.0000 | 1.5963 | 0.0000 | 0.0000 |

With this construction, the multiplication of all of $\gamma_j$ is 0.4000 and the sum of all $\alpha_j$ is −0.0010, thus satisfying the condition (1).

The following TABLE 3 shows a relationship between the incident angle $\phi$ (deg.) to the first prism 31 and the exit angle $\omega$ (deg.) from the second prism 32. The TABLE 3 also shows an imaginary exit angle $\psi$, an angular magnification $\gamma$, a percentage difference $\gamma'$, and an exit angle error $\delta$. The imaginary exit angle $\psi$ is defined as an exit angle where the angular magnification is constant, i.e., the imaginary exit angle is determined by multiplying the incident angle $\phi$ by the paraxial angular magnification $\gamma_0$ (in this example, equal to 0.400066). The angular magnification $\gamma$ is an actual angular magnification and the percentage difference $\gamma'$ is a difference between the angular magnification $\gamma$ at each incident angle with respect to the paraxial angular magnification $\gamma_0$. That is, $\gamma'=(\gamma_0-\gamma)/\gamma_0$. The exit angle error $\delta$ is obtained by subtracting the imaginary exit angle $\psi$ from the exit angle $\omega$.

TABLE 3

| Incident Angle $\phi$ | Exit Angle $\omega$ | Imaginary Exit Angle $\psi$ | Angular Magnification $\gamma$ | % Difference $\gamma'$ | Exit Angle Error $\delta$ |
|---|---|---|---|---|---|
| −2.0 | −0.79919 | −0.80013 | 0.39960 | 0.12% | 0.00094 |
| −1.6 | −0.63962 | −0.64011 | 0.39976 | 0.08% | 0.00049 |
| −1.2 | −0.47988 | −0.48008 | 0.39990 | 0.04% | 0.00020 |
| −0.8 | −0.31999 | −0.32005 | 0.29999 | 0.02% | 0.00006 |
| −0.4 | −0.16002 | −0.16003 | 0.40005 | 0.00% | 0.00001 |
| 0.0 | 0.00000 | 0.00000 | 0.40007 | 0.00% | 0.00000 |
| 0.4 | 0.16002 | 0.16003 | 0.40005 | 0.00% | −0.00001 |
| 0.8 | 0.31999 | 0.32005 | 0.39999 | 0.02% | −0.00006 |
| 1.2 | 0.47987 | 0.48008 | 0.39989 | 0.04% | −0.00021 |
| 1.6 | 0.63961 | 0.64011 | 0.39976 | 0.08% | −0.00050 |
| 2.0 | 0.79918 | 0.80013 | 0.39959 | 0.12% | −0.00095 |

By comparing the values of the exit angle error $\delta$ in TABLE 1 and TABLE 3, it can be seen that the beam shaping optical system 30 of the embodiment has smaller values than the conventional system. In particular, the exit angle error $\delta$ in the embodiment is ¼–⅕ that of the conventional system within a range of ±2 degrees for the incident angle $\phi$.

Figure 3:
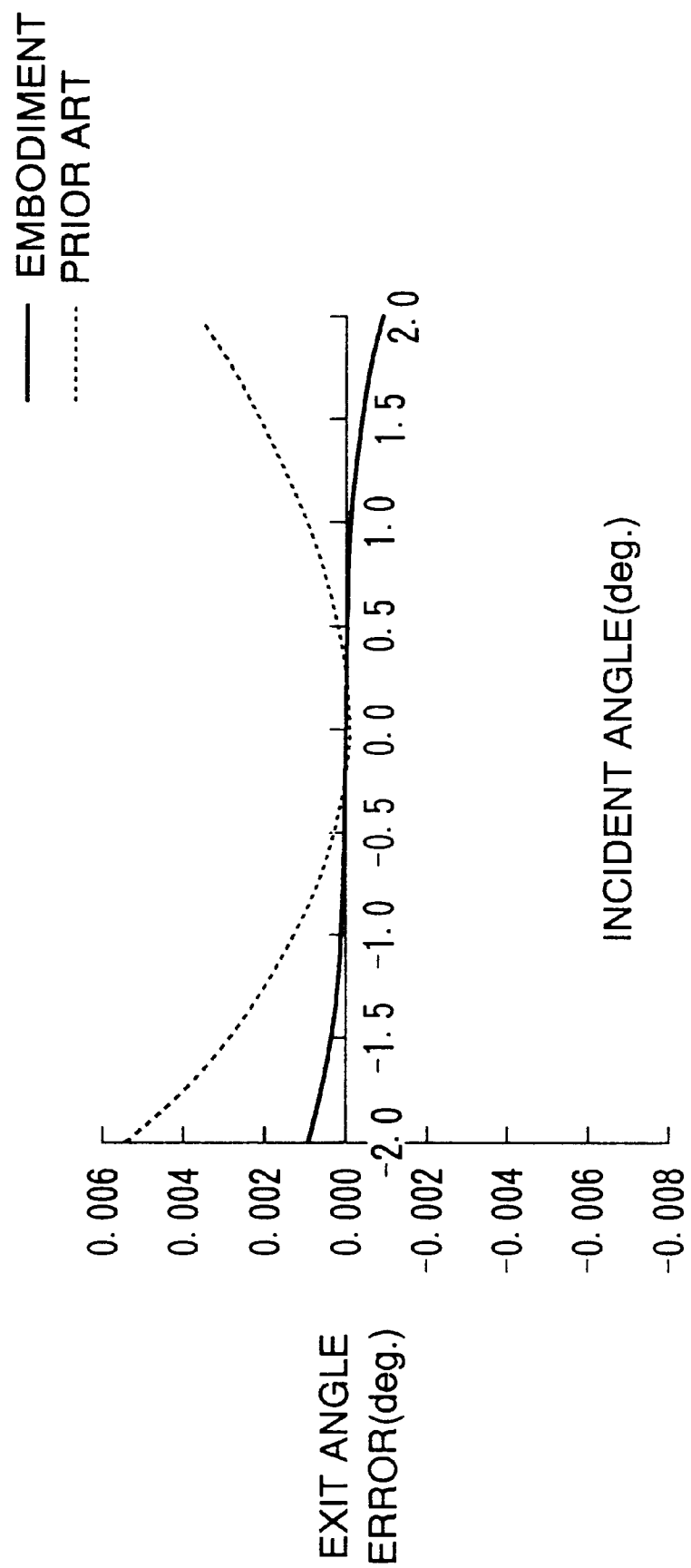
FIG. 3 is a graph illustrating a difference between an exit angle error of a conventional beam shaping optical system and that of the beam shaping optical of the embodiment.

FIG. 3 shows a graph of the relationship between the incident angle $\phi$ and the exit angle error $\delta$ in the beam shaping optical system 30 as a solid line, and the same relationship in the conventional system as a broken line. FIG. 3 also shows that the exit angle error $\delta$ of the embodiment is controlled by third or higher order, odd order functions.

As a particular example, when the beam shaping optical system 30 is used in a magneto-optic disk device that uses a magneto-optic disk having a track width of 1.6 $\mu$m, the value of $\Sigma\alpha_j$ should fall in the range of ±0.003 to prevent the shift of the beam spots on the disk due to the difference of the angular magnification from being detected as a tracking error. The beam shaping optical system of the embodiment satisfies this strict condition and thus is suitable for use in a magneto-optic disk device.

The above description deals with distortion caused in a beam shaping optical system that consists of a plurality of prisms and a condition for controlling the distortion due to changes in incident angle. However, in the beam shaping optical system, there are two factors causing distortion, a first factor is the exit angle error due to a change of angular magnification in accordance with a change of incident angle as discussed above and a second factor is caused by a difference between the angular magnification and an image magnification. Although the angular magnification is determined by the relationship of the incident and exit angles ($\omega/\phi$), a lateral magnification is determined by the relationship of the tangents of the incident and exit angles (tan $\omega$/tan $\phi$). This difference generates distortion. This second factor is general and an essential characteristic in an imaging optical system.

The distortion due to the first factor can be reduced as described above. However, since the change of angular magnification in relation to incident angle cannot be zero in a system including two wedge prisms, in the embodiment, the distortion due to the first factor remains at a level of $0.030\times\phi^2$ for an incident angle $\phi$.

The distortion due to the second factor is generated even if the angular magnification is constant for all incident angles $\phi$. In particular, in an imaging optical system, for an image point, which corresponds to a single object point, a distance from an optical axis is determined by a tangent of the incident angle of the principal ray and a focal length of the optical system. Further, the angular magnification $\gamma$ of the beam shaping optical system defines the relationship between an incident angle $\phi$ and an exit angle $\omega$ as $\gamma\times\phi=\omega$, such that distortion occurs in the image due to the angular magnification $\gamma$. If this relationship can instead be defined as $\gamma\times\tan\phi=\tan\omega$, distortion due to the second factor is avoided. However, it is difficult to provide such a function in the beam shaping optical system itself.

To illustrate the second factor, the following TABLE 4 shows the relationship between the incident angle and the distortion in an imaginary beam shaping optical system where the angular magnification is constant ($\gamma=0.400$) for all incident angles $\phi$, that is, the distortion shown in TABLE 4 is due to the second factor only. In the TABLE 4, $\omega_0$ denotes an imaginary exit angle where $\gamma\times\tan\phi=\tan\omega_0$ is satisfied (i.e. $\omega_0=\arctan(\gamma\times\tan\phi)$) such that the second factor is eliminated and $\omega$ denotes a calculated exit angle based on the relation $\gamma\times\phi=\omega$ (i.e. $\omega=\gamma\times\phi$). D0 denotes an imaginary distortion, that is, a ratio of a difference between the imaginary exit angle $\omega_0$ and the calculated exit angle $\omega$.

TABLE 4

| Incident angle $\phi$ | Imaginary exit angle $\omega_0$ | Calculated Exit Angle $\omega$ | Distortion $D_0$ |
|---|---|---|---|
| 0.0 | 0.0000 | 0.0000 | 0.000% |
| 1.0 | 0.4000 | 0.4000 | 0.009% |
| 2.0 | 0.8003 | 0.8000 | 0.034% |
| 3.0 | 1.2009 | 1.2000 | 0.077% |
| 4.0 | 1.6022 | 1.6000 | 0.140% |
| 5.0 | 2.0043 | 2.0000 | 0.220% |
| 6.0 | 2.4074 | 2.4000 | 0.310% |
| 7.0 | 2.8118 | 2.8000 | 0.420% |
| 8.0 | 3.2176 | 3.2000 | 0.550% |

TABLE 4-continued

| Incident angle $\phi$ | Imaginary exit angle $\omega_0$ | Calculated Exit Angle $\omega$ | Distortion $D_0$ |
|---|---|---|---|
| 9.0 | 3.6251 | 3.6000 | 0.700% |
| 10.0 | 4.0344 | 4.0000 | 0.860% |

In this case, the distortion $D_0$ due to the second factor is equal to $0.0086 \times \phi^2$ for an incident angle $\phi$.

Thus, the amount of distortion caused by the beam shaping optical system 30 of the embodiment is equal to $0.039 \times \phi^2$, that is, the sum of the distortion $0.030 \times \phi^2$ by the first factor and the distortion $0.0086 \times \phi^2$ by the second factor. Therefore, as an example, if the incident angle is equal to 2 degrees the distortion is equal to 0.16%.

However, as described above, the distortion caused in the beam shaping optical system 30 can be counterbalanced using the other elements of the optical system. In the imaging optical system shown in FIG. 1, the collimator lens 20 or the objective lens 43 may be designed with distortion to counteract the distortion of the beam shaping optical system 30. As a result, the distortion of the total optical system can be reduced.

In particular, if the collimator lens 20 is provided with distortion to compensate the distortion caused by the beam shaping optical system 30, the collimator lens 20 should be provided with negative distortion when aberrations of the collimator lens 20 are evaluated in a condition in which a parallel light beam is incident into the collimator lens 20 from the direction of the beam shaping optical system 30.

On the other hand, if the objective lens 43 is provided with distortion to compensate the distortion caused by the beam shaping optical system 30, the objective lens 43 should be provided with positive distortion when aberrations of the objective lens 43 are evaluated in a condition in which a parallel light beam is incident into the objective lens 43 from the direction of the beam shaping optical system 30.

As a particular example, FIG. 4 shows An arrangement of the collimator lens 20 that includes distortion to counterbalance the distortion caused by the beam shaping optical system 30. As noted above, in the current example, the collimator lens 20 should have a distortion of $-0.039 \times \phi_c^2$, where $\phi_c$ denotes an incident angle to the collimator lens. As shown in FIG. 4, the collimator lens 20 includes a first lens 21 that is a positive meniscus lens, a second lens 22 having negative power, a third lens 23 having positive power, a fourth lens 24 having positive power, a fifth lens 25 that is a double concave lens, and a sixth lens 26 that is a double convex lens. These lens elements are arranged in order from an incident side, i.e., the side of a cover glass 12 of the multi-beam semiconductor laser 10.

An example numerical construction of the collimator lens 20 is described in TABLE 5. In the table, FNo. denotes an F-number, f denotes a focal length (mm), $\phi$cmax denotes the maximum incident angle of a light ray, r denotes a radius of curvature (mm), d denotes a distance between the surfaces along the optical axis (mm), n denotes a refractive index at a wavelength of 780 nm and v denotes an Abbe number.

Surface numbers are defined from the left side in FIG. 4, for example, the surface numbers 1 and 2 represent the sixth lens 26. The surface numbers 12 and 13 represent the cover glass 12.

FIGS. 5(A) and 5(B) are graphs showing aberrations of the collimator lens 20 when a parallel light beam is incident from the direction of the beam shaping optical system 30, that is, first incident on the sixth lens 26. FIG. 5(A) shows a spherical aberration SA and a sine condition SC and FIG. 5(B) shows distortion.

TABLE 5

F no. 1:1.4    f = 5.56    $\phi_{cmax}$ = 5.0 degrees

| Surface No. | r | d | n780 | v |
|---|---|---|---|---|
| 1 | 8.664 | 1.200 | 1.61139 | 63.4 |
| 2 | −41.227 | 0.830 | | |
| 3 | −6.490 | 1.000 | 1.82484 | 23.8 |
| 4 | 17.521 | 2.840 | | |
| 5 | −65.663 | 1.300 | 1.76203 | 49.6 |
| 6 | −7.058 | 3.000 | | |
| 7 | 9.231 | 1.600 | 1.82195 | 42.7 |
| 8 | −8.364 | 1.000 | 1.82484 | 23.8 |
| 9 | 37.586 | 0.400 | | |
| 10 | 3.773 | 2.400 | 1.86888 | 40.8 |
| 11 | 3.047 | 0.887 | | |
| 12 | ∞ | 0.250 | 1.51072 | 64.1 |
| 13 | ∞ | | | |

Figure 6:
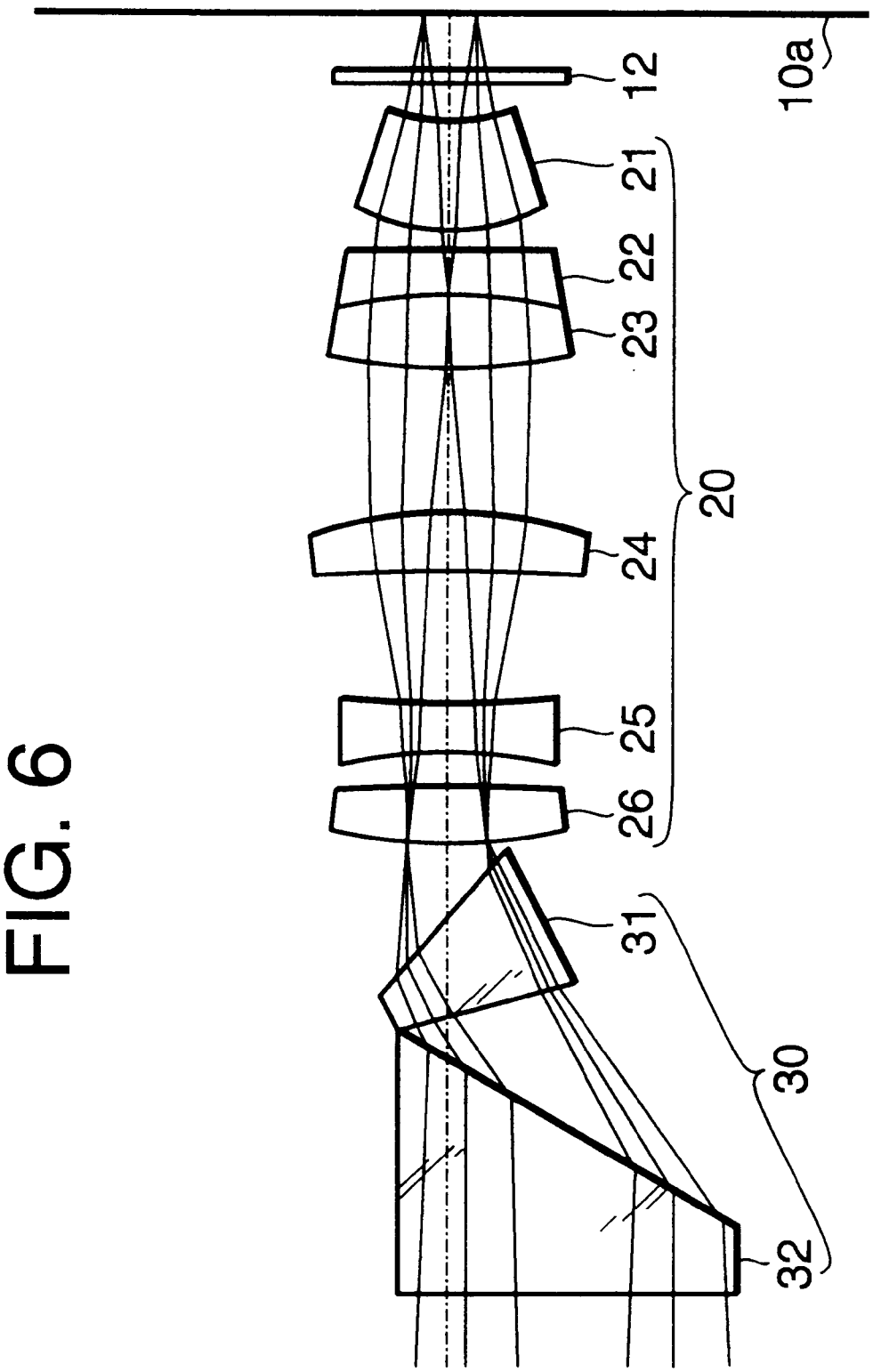
FIG. 6 shows an optical system including the beam shaping optical system of FIG. 2 and the collimator lens of FIG. 4.
Figure 7:
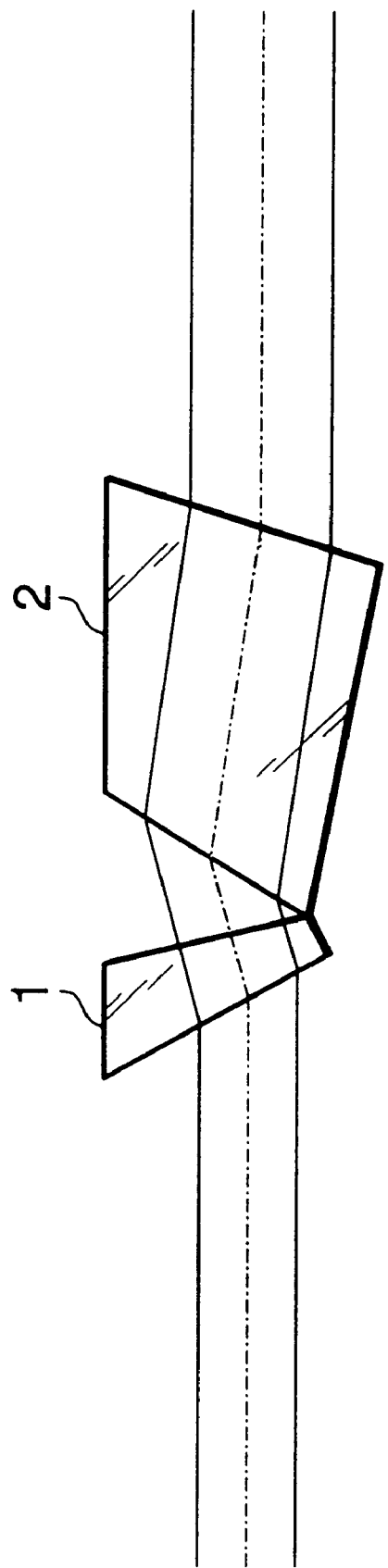
FIG. 7 shows the conventional beam shaping optical system.

FIG. 6 is a light ray diagram of the collimator lens 20 and the beam shaping optical system 30. Three light emitting points are located on a light emitting surface 10a of the multi-beam semiconductor laser 10. Three divergent laser beams emitted from the light emitting points are converted into parallel laser beams via the collimator lens 20 and are then incident to the beam shaping optical system 30, each at a different incident angle. The laser beams are expanded in the X direction by the beam shaping optical system 30, and then each exit at a different exit angle, respectively.

In examining the distortion of the beam shaping optical system 30 and the collimator lens 20 shown in FIG. 6, consider a parallel light beam provided incident to the beam shaping optical system 30 in a reverse direction, i.e., from the left side of FIG. 6. TABLE 6 shows a relationship between an incident angle $\phi_s$ of the parallel light beam on the exit surface 32b of the second prism 32, an imaginary spot position Si of a beam spot relative to the axis Fx calculated assuming no distortions due to the first and second factors, an actual spot position Sr relative to the axis Fx, and the distortion D, i.e., (Sr−Si)/Si.

TABLE 6

| Incident angle $\phi_s$ | Imaginary spot position Si | Actual spot position Sr | Distortion D |
|---|---|---|---|
| −2.0 | 0.485266 | 0.485200 | −0.01% |
| −1.6 | 0.388156 | 0.388114 | −0.01% |
| −1.2 | 0.291084 | 0.291062 | −0.01% |
| −0.8 | 0.194040 | 0.194032 | 0.00% |
| −0.4 | 0.097015 | 0.097014 | 0.00% |
| 0.0 | 0.000000 | 0.000000 | 0.00% |
| 0.4 | −0.097015 | −0.097016 | 0.00% |
| 0.8 | −0.194040 | −0.194037 | 0.00% |
| 1.2 | −0.291084 | −0.391063 | −0.01% |
| 1.6 | −0.388156 | −0.388092 | −0.02% |
| 2.0 | −0.485266 | −0.485121 | −0.03% |

With the arrangement shown in FIG. 6, the distortion of the optical system including the collimator lens 20 and the beam shaping optical system 30 is reduced to −0.03%, that is, about a quarter of the distortion (0.12%, see FIG. 3) without compensation using the collimator lens 20.

In the above embodiment, the light emitting points are aligned on a line. If, alternatively, a light source having a plurality of light emitting points arranged in a two-dimensional array is used in place of the multi-beam semiconductor laser described above, the exit angle error in a direction parallel to the principal section can be reduced as described above, and, since wedge prisms have no angular magnification in a direction perpendicular to the principal section, the exit angle error in a direction perpendicular to the principal section will be relatively low.

As mentioned above, since the change of the angular magnification related to a change of incident angle can be controlled, when the exit direction of the light beam is to be adjusted, it is possible to adjust the incident angle of the light beam without having to adjust the beam shaping optical system. Further, since the angular magnification for each of a plurality of light beams incident at different incident angles is almost constant, when the light beams are converged by an objective lens, intervals between the beam spots are determined by the intervals between the emitting points and the difference of the incident angles. That is, when the light beams are incident at constant angular differences, the beam spots are formed at regular intervals.

The present disclosure relates to subject matter contained in Japanese Patent Application No. HEI 08-143649, filed on May 14, 1996 which is expressly incorporated herein by reference in its entirety.

What is claimed is:

1. A beam shaping optical system comprising:

a first wedge prism having two refractive surfaces defining a first principal section; and a second wedge prism having two refractive surfaces defining a second principal section, said second principal section being parallel to said first principal section;

wherein a reference ray of light forms incident angles at each of said refractive surfaces of said prisms satisfying the following condition (1):

$$\left| \sum_{j=1}^{L} \alpha_j \right| < 0.020$$

where j is a refractive surface number defined from the incident side,

L is a total number of refractive surfaces, and $$\alpha_j = \prod_{k=1}^{j-1} \gamma_k \cdot \varepsilon_j$$

where $\pi$ is an operator to give multiplication of all $\gamma_k \cdot \varepsilon_j$, $$\gamma_j = \frac{\cos\theta_{0j}}{(n_{1j}^2/n_{0j}^2 - \sin^2\theta_{0j})^{1/2}}, \text{ and}$$

$$\varepsilon_j = -\frac{(n_{1j}^2/n_{0j}^2 - 1)\sin\theta_{0j}}{(n_{1j}^2/n_{0j}^2 - \sin^2\theta_{0j})\cos\theta_{0j}}$$

where $\theta_{0j}$ is an incident angle of said reference light ray to the j-th surface, $n_{0j}$ is a refractive index of a medium at the incident side of the j-th surface, and $n_{1j}$ is a refractive index of a medium at the exit side of the j-th surface.

2. The beam shaping optical system according to claim 1, one of said first principal section and said second principal section containing a principal ray of a light beam that is emitted from an emitting point and refracted by each of said surfaces of said prisms.

3. The beam shaping optical system according to claim 1, provided in a light emitting device, said light emitting device comprising:

a light source including a plurality of light emitting points for emitting a plurality of light beams;

a collimator lens for converting said light beams from said light source into parallel beams; and said beam shaping optical system being arranged such that the parallel beams from said collimator lens are incident thereon.

4. The light emitting device according to claim 3, said light emitting points being aligned along a line that is parallel to said principal sections.

5. The light emitting device according to claim 3, said collimator lens having distortion to compensate for distortion generated by said beam shaping optical system.

6. The light emitting device according to claim 5, said collimator lens having a negative distortion when aberrations of said collimator lens are evaluated under a condition in which a parallel light beam is incident into said collimator lens from a direction of said beam shaping optical system.

7. The light emitting device according to claim 3, said light source comprising a multi-beam semiconductor laser.

* * * * *

UNITED STATES PATENT AND TRADEMARK OFFICE
CERTIFICATE OF CORRECTION

PATENT NO. : 6,038,089
DATED : March 14, 2000
INVENTOR(S) : K. MARUYAMA et al.

It is certified that error appears in the above-identified patent and that said Letters Patent is hereby corrected as shown below:

On the cover of the printed patent, at Item [22], Filing Date, "1996" should be ---1997---.

Signed and Sealed this

Twenty-fourth Day of April, 2001

Attest:

NICHOLAS P. GODICI

*Attesting Officer*      Acting Director of the United States Patent and Trademark Office